United States Patent
Gottswinter (10) Patent No.: US 8,112,554 B2
(45) Date of Patent: Feb. 7, 2012

(54) METHOD AND DEVICES FOR TRANSMITTING DATA ON A DATA LINE BETWEEN A CONTROL DEVICE AND AT LEAST ONE DECENTRALIZED DATA PROCESSING DEVICE

(75) Inventor: Wolfgang Gottswinter, Regensburg (DE)

(73) Assignee: Continental Automotive GmbH, Munich (DE)

( * ) Notice: Subject to any disclaimer, the term of this patent is extended or adjusted under 35 U.S.C. 154(b) by 1163 days.

(21) Appl. No.: 11/910,274

(22) PCT Filed: Mar. 28, 2006

(86) PCT No.: PCT/EP2006/061113
§ 371 (c)(1),
(2), (4) Date: Oct. 1, 2007

(87) PCT Pub. No.: WO2006/103243
PCT Pub. Date: Oct. 5, 2006

(65) Prior Publication Data
US 2008/0183929 A1    Jul. 31, 2008

(30) Foreign Application Priority Data
Mar. 31, 2005 (DE) .......................... 10 2005 014 783

(51) Int. Cl.
*G06F 3/00* (2006.01)

(52) U.S. Cl. ......... 710/10; 710/4; 710/6; 710/8; 710/20; 710/21; 710/31; 710/32; 710/33; 710/52; 710/58; 710/61

(58) Field of Classification Search .................. 710/4, 6, 710/8, 10, 20, 21, 31, 32, 33, 52, 58, 61
See application file for complete search history.

(56) References Cited

U.S. PATENT DOCUMENTS

| | | | | |
|---|---|---|---|---|
| 4,538,252 A | * | 8/1985 | Aviram ...................... 369/13.01 |
| 4,751,633 A | * | 6/1988 | Henn et al. ....................... 714/18 |
| 5,001,642 A | * | 3/1991 | Botzenhardt et al. ......... 701/115 |
| 5,029,209 A |   | 7/1991 | Strong, Jr. et al. |
| 5,303,348 A | * | 4/1994 | Botzenhardt et al. ......... 710/114 |
| 5,357,141 A | * | 10/1994 | Nitschke et al. ............. 307/10.1 |

(Continued)

FOREIGN PATENT DOCUMENTS
DE 44 28 502 A1 2/1996
(Continued)

*Primary Examiner* — Tariq Hafiz
*Assistant Examiner* — Jasjit Vidwan
(74) *Attorney, Agent, or Firm* — Laurence A. Greenberg; Werner H. Stemer; Ralph E. Locher (57) ABSTRACT

A method of transmitting data on a data line between a central control device and a decentralized data processing device. During a normal operation of the system, the central control device periodically sends synchronization pulses to the at least one data processing device via the data line in order to request data packets, and the decentralized data processing device sends the data thereof to be transmitted, as data packets, to the central control device, following the synchronization pulse. The data line is embodied as a data bus. Each of the decentralized data processing devices is configured by the central control device before the first transmission of data packets to the central control device. In order to configure the system, a bi-directional communication is carried out between the central control device and the at least one decentralized data processing device.

17 Claims, 4 Drawing Sheets

U.S. PATENT DOCUMENTS

| | | | |
|---|---|---|---|
| 5,640,511 A * | 6/1997 | Botzenhardt et al. | 714/57 |
| 5,969,631 A * | 10/1999 | Ammler et al. | 370/514 |
| 6,185,252 B1 * | 2/2001 | Bauer | 375/238 |
| 6,777,825 B1 | 8/2004 | Swart et al. | |
| 6,836,714 B1 | 12/2004 | Nitsche et al. | |
| 6,892,216 B2 * | 5/2005 | Coburn et al. | 709/200 |
| 2005/0154474 A1 * | 7/2005 | Kauntz et al. | 700/1 |
| 2005/0283209 A1 * | 12/2005 | Katoozi et al. | 607/60 |
| 2007/0032933 A1 | 2/2007 | Glaser | |
| 2010/0306569 A1 * | 12/2010 | Pyeon | 713/503 |

FOREIGN PATENT DOCUMENTS

| | | |
|---|---|---|
| DE | 196 09 290 A1 | 4/1997 |
| DE | 197 32 873 C2 | 2/1999 |
| DE | 199 09 535 C1 | 9/2000 |
| DE | 103 21 678 A1 | 12/2004 |
| DE | 103 21 679 A1 | 12/2004 |
| JP | 1135150 A | 5/1989 |
| JP | 2003509791 T | 3/2003 |
| WO | 2004101326 A1 | 11/2004 |

* cited by examiner

METHOD AND DEVICES FOR TRANSMITTING DATA ON A DATA LINE BETWEEN A CONTROL DEVICE AND AT LEAST ONE DECENTRALIZED DATA PROCESSING DEVICE

BACKGROUND OF THE INVENTION

Field of the Invention

The invention relates to a method and devices for transmitting data on a data line between a central control device and at least one decentralized data processing device, wherein in a normal operating mode of the arrangement the central control device periodically outputs synchronization pulses via the data line to the at least one data processing device in order to request data packets, and the decentralized data processing device sends its data which is awaiting transmission to the central control device as a data packet following the synchronization pulse.

Such a method and suitable devices are disclosed in DE 196 09 290 A1. The cited document describes a sensor module which is connected to the central control device via a data line. The sensor module comprises an acceleration-sensitive sensor and periodically, every 500 μs, transmits a coded data packet which is prepared from the sensor measured values of the sensor to the control device in a current-modulated manner as soon as it has recognized a synchronization voltage pulse on the line.

A multiplicity of such sensor modules can be attached to the control device, each of the sensor modules being connected to an interface of the control device via an individual two-wire line. The communication between the control device and the sensor modules takes place bidirectionally, thereby allowing both signal transmission from a sensor module to the control device and vice versa. This allows configuration of each sensor module when the vehicle is completed, when it first becomes operational, or even after it has been repaired following an accident, by triggering the relevant sensor module via the control device.

For communication between the control device and a sensor module, in a first variant a decrease of a voltage value from an initially higher value to a lower value is effected on the connection line between the control device and the sensor module. The voltage decrease takes place at a time point T1 and lasts until a time point T2. At this time point T2, the voltage is raised again from the decreased value to the original value. This type of voltage control can be repeated cyclically. The time duration of the voltage decrease can be detected by the sensor module, the sensor module being able to recognize, with reference to the time difference between the time points T2 and T1, whether a specific control signal of the control device is present or not. In a second variant, a control signal consisting of a plurality of voltage fluctuations is sent, said control signal containing information in coded form for the sensor module.

Once each of the sensor modules is connected to the control device via an individual data line, the sensor modules can transfer their data, containing the sensor measured values, at undefined time points or even concurrently to the control device which performs the further analysis of this data. Communication from the control device with one of the sensor modules takes place via the interface which is assigned to this sensor module. Such an arrangement makes it possible to utilize structurally identical sensor module.

The construction of a sensor device as described above is particularly simple in terms of communications technology, since no precautions are required with regard to the communication. However, it is disadvantageous that a separate data line must be laid for each module in a vehicle, thereby incurring considerable expense.

Further methods of the type in question are disclosed in DE 103 21 679 A1 and DE 199 09 535 C1.

SUMMARY OF THE INVENTION

The present invention therefore addresses the problem of establishing a possibility for transmitting data on a data line between a central control device and at least one decentralized data processing device, wherein structurally identical data processing devices can be utilized and the method can be carried out using a minimum of circuit-related resources.

This problem is solved by a method having the features according to claim 1, with a decentralized data processing device having the features set forth in claim 16, with a central control device having the features set forth in claim 17, and with an arrangement having the features set forth in claim 18. Advantageous embodiments are derived from the dependent claims.

In the inventive method for transmitting data on a data line between a central control device and at least one decentralized data processing device, the central control device requests data packets from the at least one decentralized data processing device by periodically outputting synchronization pulses via the data line. After the synchronization pulse, the at least one decentralized data processing device transmits the requested data to the central control device via the data line as one or more data packets. According to the invention, the data line is embodied as a data bus, wherein each of the decentralized data processing devices is configured by the central control device before the first transmission of data packets to the central control device, wherein a bidirectional communication between the central control device and the at least one decentralized data processing device takes place for the purpose of configuring the arrangement. As a result of the configuration, normal communication is set up between the at least one data processing device and the central control device.

The method according to the invention allows the utilization of structurally identical decentralized data processing devices. Since these will be attached to a data line having the form of a bus line with a view to a simple configuration of the arrangement, they must be configured so as to provide error-free communication subsequently. In order to avoid preconfiguration during the manufacturing process, provision is made for configuring each of the decentralized data processing devices before the first transmission of data packets to the central control device. In this case, the configuration is to be carried out by the central control device. For this, provision is made for sending corresponding data from the central control device to the at least one decentralized data processing device. Since the configuration is to take place before the first transmission of data packets to the central control device, a corresponding configuration therefore takes place automatically, e.g. when the arrangement is activated. This procedure allows a faulty decentralized data processing device to be exchanged easily, for example, and replaced by another structurally identical decentralized data processing device. Correspondingly, it is also possible to attach new decentralized data processing devices to the data line without having first to perform a configuration which is specific to the data processing device.

A preferred application of the inventive method is the field of passenger protection in motor vehicles as described in DE 196 09 290 A1 cited in the introduction. However, the invention can also be utilized in such fields as those in which secure data transmission is of critical importance. In an application of the inventive method in the field of passenger protection in a motor vehicle, the central control device is preferably a centrally arranged central control device of a passenger protection system (a so-called Electronic Control Unit, ECU), and the decentralized data processing device is preferably a sensor unit which is attached to the central control device and is also referred to as a satellite.

According to a development of the method according to the invention, provision is made for data which must be transmitted in the context of the bidirectional communication from the central control device to the at least one decentralized data processing device to be sent as a sequence of synchronization pulses, and for data which must be transmitted during a communication from the at least one decentralized data processing device to the central control device to be sent to the central control device as a data packet following the synchronization pulse. This advantageous embodiment allows the use of conventional central control devices and decentralized data processing devices, since these do not need to be modified for bidirectional communication in terms of their hardware implementation. While the communication from the decentralized data processing device to the central control device is implemented in a conventional manner, the data which must be transmitted to the at least one decentralized data processing device for the purpose of configuration is coded into the synchronization pulses which are periodically generated by the central control device. The configuration of a decentralized data processing device therefore takes place by means of the analysis of the synchronization pulses which are expected periodically. The presence of a synchronization pulse can be interpreted as a logical first value and the non-generation of a synchronization pulse as a logical second value, for example.

According to a development, the configuration of the at least one decentralized data processing device is performed during an initialization phase of the arrangement. In this case, the initialization phase can be executed after each activation or reset of the arrangement, such that a configuration takes place each time the arrangement is restarted. As a result of this, it is possible as described above to exchange individual decentralized data processing devices or add new data processing devices to the data line without further measures.

In a development, the configuration of a decentralized data processing device includes the sending of a predetermined configuration sequence which can be analyzed by the decentralized data processing device. The configuration sequence can contain corresponding configuration data, in a predetermined order, which is analyzed by the data processing device. A configuration sequence preferably contains all data required for the configuration, such that the configuration of an individual data processing device can be performed easily and quickly.

In a development, provision is made for the configuration of a decentralized data processing device to include at least the assignment of a unique address, wherein the address defines a sending time point following the receipt of a synchronization pulse for the normal operating mode, said sending time point being unique for the arrangement. The assignment of an address, which represents a unique sending time point following the receipt of a synchronization pulse, is therefore necessary for orderly communication between the central control device and a plurality of data processing devices which are attached to the data line. This ensures that the decentralized data processing devices which are attached to the data line do not put their data packets on the data line simultaneously. As a result of the control device defining the sending time point by means of the assigned address, the central control device is moreover able to recognize which data packet is to be attributed to which of the decentralized data processing devices, in order to initiate a suitable protective means in this area if necessary.

In a development, provision is made for a decentralized data processing device to send its address to the central control device following successful configuration. On the basis of this information, the central control device is able to check the correct configuration of the data processing device concerned.

In a further embodiment, a decentralized data processing device which has already been configured sends a status to the central control device during the course of the configuration of a further decentralized data processing device. In this way, the central control device can be notified of the proper functioning of a decentralized data processing device during the overall configuration process.

It is furthermore advantageous if a decentralized data processing device which has already been configured ignores a configuration sequence which is transmitted via the data line. This procedure avoids the need for specific message protocols. The configuration sequence can therefore be structured identically, irrespective of which decentralized data processing device is being configured at the time. A specific addressing is not necessary.

In a further embodiment, provision is made for a configuration end sequence to be transmitted as a configuration sequence after configuration of all decentralized data processing devices is complete, whereupon the arrangement switches into the normal operating mode. The configuration end sequence signals to the data processing devices attached to the data line that the configuration procedure is finished and that regular operation is now starting, in which according to their defined sending time point the data processing devices send their data which is awaiting transmission to the central control device as a data packet after the synchronization pulse.

In this case, provision is also made for the configuration of a plurality of decentralized data processing devices which are connected to the bus line to take place sequentially. It is thus possible to dispense with message-specific protocols. In this case, the configuration of a plurality of data processing devices which are connected to the data line takes place such that the data processing device which is directly connected to the central control device is configured first. In the next step, the data processing device which is adjacent to the data processing device that has already been configured is configured, etc.

In the event of an unsuccessful configuration of one of the decentralized data processing devices, provision is also made for terminating the configuration and reconfiguring all decentralized data processing devices attached to the data line. This ensures that the arrangement only switches into the normal operating mode if all of the data processing devices attached to a data line can be configured correctly.

In order to avoid a change of hardware components in the central control device, provision is made for selecting the same frequency of periodic synchronization pulses and/or the same pulse/pause ratio during the configuration and the normal operating mode.

In a further embodiment, the decentralized data processing device is a sensor unit and the data packets sent from this sensor unit to the central control device contain sensor measured values.

The synchronization pulse is preferably sent as a voltage pulse, while the data packets of the decentralized data processing device are preferably sent as current pulses.

A decentralized data processing device according to the invention, for use in a method for transmitting data in accordance with the described method, is characterized in that it includes a switch element which can be triggered by the decentralized data processing device and which separates the data line in its open position such that a subsequent decentralized data processing device is not able to effect an exchange of data with the central control device.

A central control device according to the invention, for use in a method as described above, includes a synchronization pulse generator for generating periodic synchronization pulses that can be applied to a data line, and includes a means for controlling the synchronization pulse generator, which means initiates the generation or non-generation of a synchronization pulse depending on a configuration sequence that must be generated. In this case, the means for controlling the synchronization pulse generator can advantageously be realized in the form of software, whereby the control device need not be subject to modifications.

The inventive arrangement which can be used for the execution of the described method features at least one decentralized data processing device and a central control device according to the invention.

The invention is further described below with reference to exemplary embodiments, wherein:

DESCRIPTION OF THE INVENTION

Figure 1:
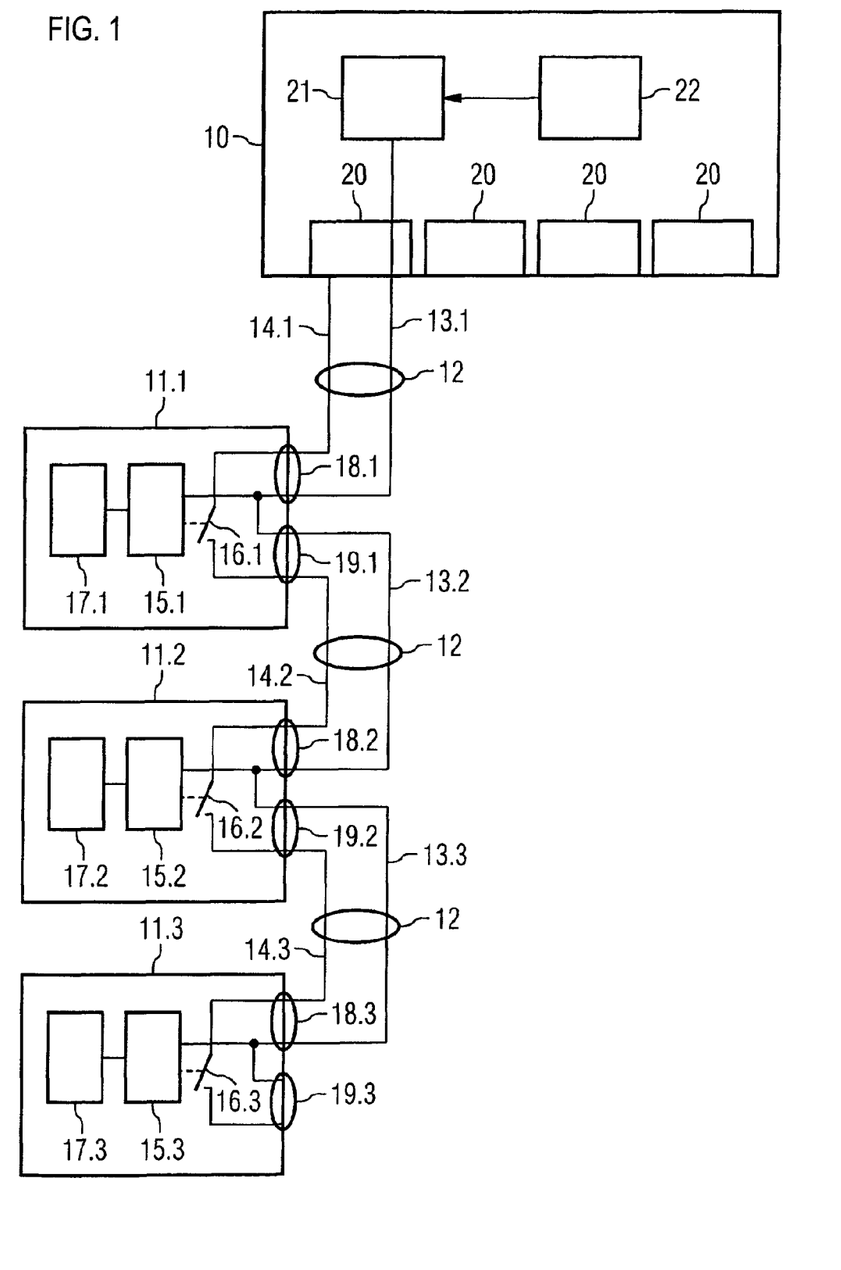
FIG. 1 shows the structure of an arrangement according to the invention, including a central control device and a plurality of decentralized data processing devices which are attached to a data line for the purpose of exchanging data.

FIG. 1 shows a central control device 10 to which, by way of example, three identically formed decentralized data processing devices 11.1, 11.2, 11.3 are attached via a data line 12. The data processing devices 11.1, 11.2, 11.3 represent, for example, sensor units which are arranged remotely from the central control device 10 in a motor vehicle. The data processing devices 11.1, 11.2, 11.3 attached to the data line 12 are attached to the control device 10, which is also referred to as Electronic Control Unit ECU, via an interface 20. The control device 10 also features three further interfaces 20, for example, to which either a plurality of data processing devices can be attached via a data line having the form of a bus line, or to which an individual data processing device is attached in each case. In a standard configuration of a protection system in a motor vehicle, the data processing devices which are provided for detecting a side-on collision are attached via a data line having the form of a bus line, while e.g. the detection of a front or rear collision takes place using individual data processing devices which are attached to the interface 20 via a two-wire line.

The data line 12 having the form of a bus line in FIG. 1 is embodied as a two-wire line which is divided into a plurality of sections in the drawing. The sections which are provided with the reference signs 13.1, 13.2, 13.3 represent a shared data line which is used firstly to output voltage pulses (Sync) to the data processing devices 11.1, 11.2, 11.3 periodically, e.g. every 500 μs, whereby the central control device 10 requests data packets from the data processing devices in the normal operating mode. Secondly, the data processing devices 11.1, 11.2, 11.3 send data packets in the form of current pulses, which contain e.g. sensor data, on this shared data line 13.1, 13.2, 13.3. Also shown is a shared ground line 14.1, 14.2, 14.3 which carries the ground potential of the central control device 10 to the attached data processing devices 11.1, 11.2, 11.3. Each of the data processing devices 11.1, 11.2, 11.3 preferably has a ground potential, to which a corresponding section of the ground line 14.1, 14.2, 14.3 is attached.

Each of the data processing devices 11.1, 11.2, 11.3 has an input 18.1, 18.2, 18.3 and an output 19.1, 19.2, 19.3, to which the corresponding sections of the data and earth lines 13.1, 13.2, 13.3 and 14.1, 14.2, 14.3 are attached. While the sections of the data line 13.1, 13.2, 13.3 are electrically interconnected in each respective data processing device 11.1, 11.2, 11.3, the sections of the ground line 14.1, 14.2, 14.3 are separably interconnected via controllable switch elements 16.1, 16.2, 16.3 which are provided in each case in the data processing devices 11.1, 11.2, 11.3. The switch elements 16.1, 16.2, 16.3 can be controlled by a respective processing unit 15.1, 15.2, 15.3 of the data processing device 11.1, 11.2, 11.3.

The data processing devices 11.1, 11.2, 11.3 also feature sensor elements 17.1, 17.2, 17.3, wherein the data which is determined by these can be applied to the data lines of respective data processing devices by a respective processing unit 15.1, 15.2, 15.3.

In addition to further elements for analyzing the information received from the data processing devices, the central control device 10 includes a synchronization pulse generator 21 and a control means 22 for influencing the emission of the synchronization pulse by the synchronization pulse generator 21.

Before the arrangement can, at the request of the central control device 10 in the normal operating mode, send data awaiting transmission as a data packet to the central control device 10 following a synchronization pulse, it is necessary for the data processing devices 11.1, 11.2, 11.3 to be configured, these being of identical design with respect to their hardware and software. In the context of the configuration, it is primarily specified at which time point a respective data processing device can send the data awaiting transmission to the central control device 10 as a data packet following receipt of a synchronization pulse.

Figure 6:
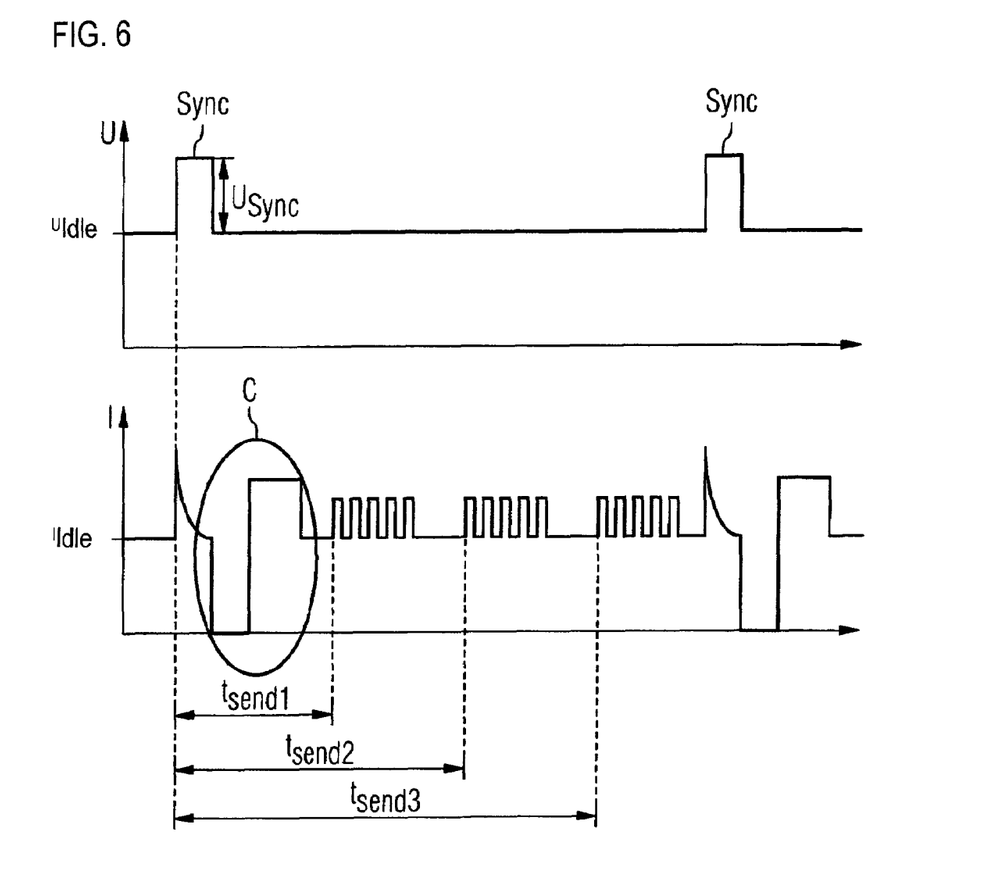
FIG. 6 shows the execution of a communication of the data processing devices with the central control device in normal operating mode.

In order better to understand the need for and purpose of the configuration, a communication sequence between the central control device 10 and the data processing devices 11.1, 11.2, 11.3 in the normal operating mode is illustrated in FIG. 6. In order to request data packets, the central control device periodically outputs synchronization pulses Sync via the data line, e.g. at intervals of 500 μs. Following one such synchronization pulse Sync, an electrical discharge pulse is generated (reference sign C) before the transmission of a first data packet. The devices required in a data processing device are described in the document DE 103 21 678 A1 of the applicant, the contents of which are included in the present application. The data processing devices 11.1, 11.2, 11.3 which are illustrated in FIG. 1 send their data awaiting transmission as data packets at the sending time points tsend1, tsend2, tsend3. The configuration of the data processing devices specifies which data processing device can transmit its data packets via the data line to the central control device at which time point.

As a result of their identical structure, the data processing devices can be attached to the data line at any desired position. This means that the sending time point, which must be assigned to each of the data processing devices, must be defined in an initialization phase of the arrangement and before a first transmission of data packets to the central control device takes place. The sending time point, which represents the response time following the receipt of a synchronization pulse, is realized by assigning an address to the data processing device, wherein said address specifies the exact sending time point for sending the data packet. This procedure has the particular advantage that configuration of the data processing devices does not have to be carried out during their manufacture.

Figure 2:
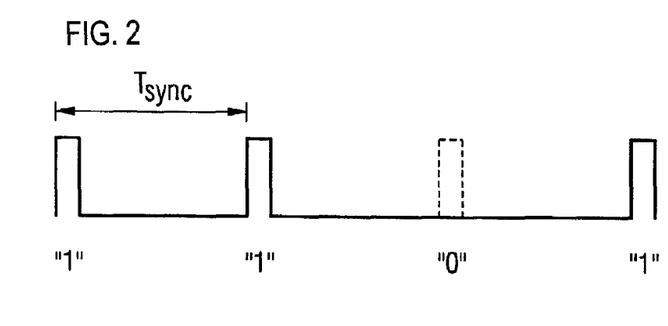
FIG. 2 shows a sequence of synchronization pulses in which configuration data can be coded.

The configuration takes place using configuration sequences, wherein the information contained in a configuration sequence is coded in the synchronization pulses Sync. Transmission of a synchronization pulse corresponds to a logical "1", for example, while absence of a synchronization pulse corresponds to a logical "0". This is illustrated schematically in FIG. 2. The generation of a configuration sequence therefore takes place as a result of the synchronization pulse generator 21 being influenced by the control means 22 (FIG. 1).

Figure 3:
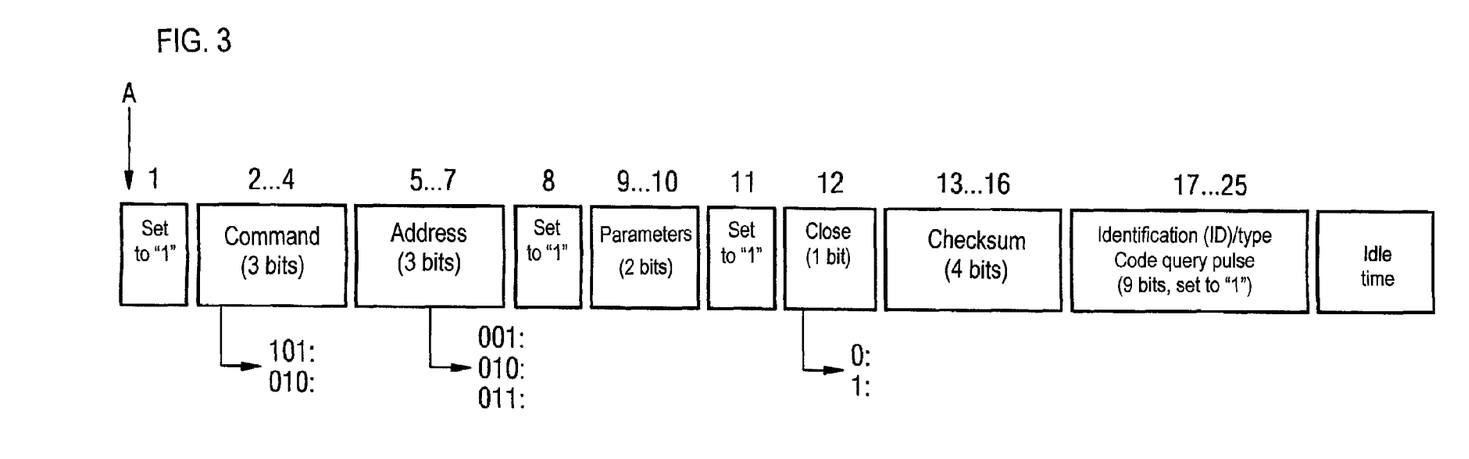
FIG. 3 shows the schematic structure of a configuration sequence for configuring a decentralized data processing device.

The addressing takes place by means of a configuration sequence as illustrated in FIG. 3. The central control device 10 sends a configuration sequence as per FIG. 3, in which coding in the bits 2 to 4 indicates that addressing is to take place. The address to be assigned to the data processing device is contained in the bits 5 to 7. Further parameters for configuration of the data processing device, e.g. relating to a desired functionality or a desired capturing or handling of sensor measurement data, can be contained in the bits 9 and 10. Bit 12 contains information which influences the position of the switch element.

In this case, the same frequency of periodic synchronization pulses and the same pulse/pause ratio are selected during the process of the configuration and the subsequent normal operating mode. This allows a reliable exchange of information between the central control device and the data processing devices. If a synchronization pulse is not detected or is incorrectly detected by a data processing device due to a fault on the data line, this can be determined with reference to a checksum, whereby the configuration procedure is terminated and repeated for all data processing devices attached to the data line.

After completion of the communication sequence, i.e. the addressing of the first data processing device 11.1, this being confirmed by the data processing device 11.1 sending its address ID, the remaining data processing devices are configured in the same manner. Meanwhile, data processing devices which are already configured, i.e. addressed, respond by means of a status message when a synchronization pulse is sent from the central control device. The status bytes which are sent from the configured data processing devices to the central control device are not analyzed by the latter. The purpose of the status bytes is merely to confirm that each addressed data processing device sends data during the sending time point which is assigned to it.

At the start of the configuration, only the data processing device 11.1 is initially connected to the ground line 14.1 as its switching element 16.1 has been opened by the processing unit 15.1. After completion of the configuration of the data processing device 11.1, it closes its switching element 16.1 whereupon the data processing device 11.2 is attached to the data line. In a corresponding manner, this data processing device is now addressed and thus receives its specific sending time point following the receipt of a synchronization pulse for the normal operating mode. After analysis of the bit 12 and the bit which is correspondingly set therein, the second data processing device 11.2 also closes its switching element 16.2, such that the same sequence is performed for the following data processing device 11.3.

Figure 5:
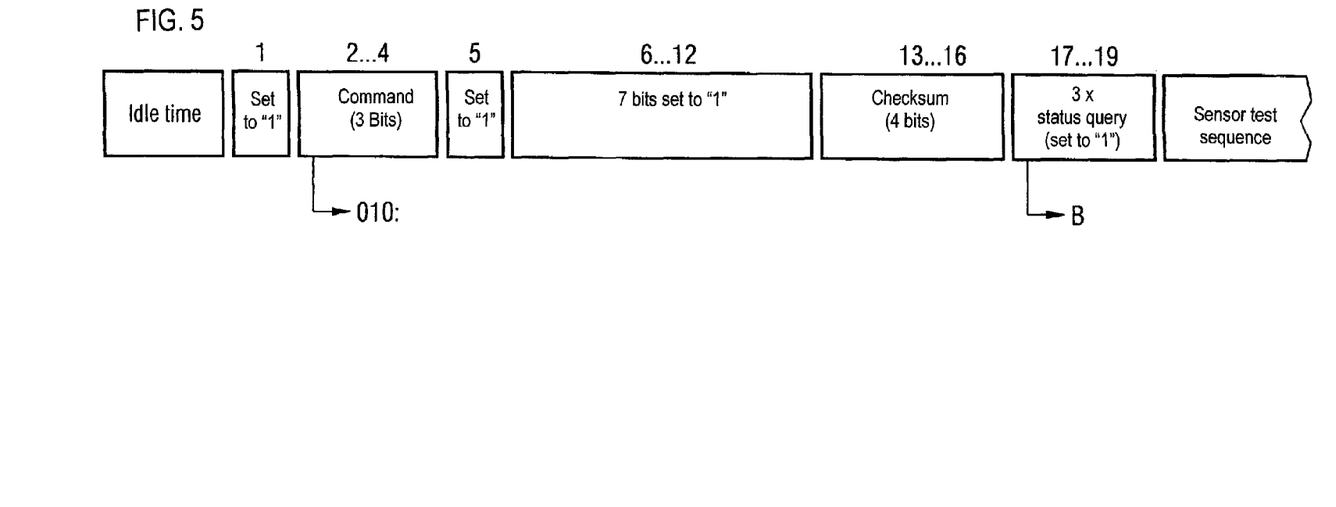
FIG. 5 shows the schematic structure of a configuration send sequence.

After the addressing or configuration of the last data processing device 11.3, an information item in the bit 12 of the configuration sequence indicates that its switching element 16.3 is to remain open. Next, a configuration sequence such as that illustrated by way of example in FIG. 5 is sent. In this context, information indicating that this is the configuration end sequence is coded into the bits 2 to 4. The bits 6 to 12 are assigned the bit 1 as standard. The bits 13 to 16 contain information allowing a checksum to be generated as in the configuration sequence. In the bits 17 to 19, the configured data processing devices 11.1, 11.2, 11.3 are prompted to send their status again, so that it is possible to check whether the correct checksum was identified.

Figure 4:
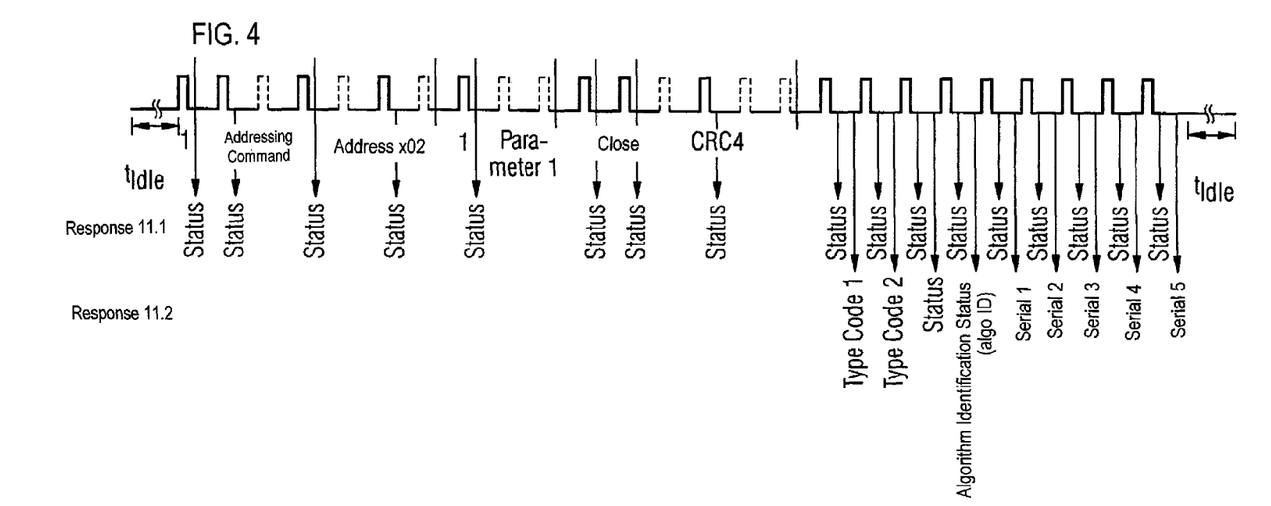
FIG. 4 shows a sequence of synchronization pulses with the configuration data contained therein, and the time-relative response activities of relevant data processing devices.

FIG. 4 shows the addressing process of the second data processing device 11.2, wherein the first data processing device 11.1 has already been addressed. In this case, the synchronization pulses 1 to 26 contained in the configuration sequence as per FIG. 1 are shown, as are the corresponding responses of the first data processing device 11.1, which has been configured, and the responses of the data processing device 11.2 which is currently in the process of configuration.

When configuration of all data processing devices is complete, the transition to the normal operating mode takes place, optionally after running through a test phase of the arrangement.

The bidirectional communication described above is therefore only necessary during the initialization phase of the data processing devices. On the basis of the synchronization pulses, wherein the presence of a synchronization pulse indicates a logical 1, for example, and the absence of a synchronization pulse indicates a logical 0, a data processing device which must be configured analyzes the information which is expected at a specific time point and composes a binary information item accordingly.

The advantage of the invention is that no additional expensive components are required in either the central control device or the data processing devices. The arrangement has good electromagnetic compatibility and can also be adjusted with regard to other parameters on the basis of the configuration which is required at this stage. The arrangement offers a high level of data reliability as a long pulse/pause time can be implemented and the detection threshold for a synchronization pulse is relatively high in comparison with idle voltage.

The invention claimed is:

1. A method of transmitting data on a data line in a system having a central control device and at least one decentralized data processing device, the method which comprises:
   in a normal operating mode of the system, periodically outputting synchronization pulses on the data line from the central control device to the at least one data processing device in order to request data packets;

transmitting data awaiting transmission from the decentralized data processing device to the central control device as a data packet following a synchronization pulse;

wherein the data line is a data bus; and prior to a first transmission of data packets to the central control device, configuring each of the decentralized data processing devices with the central control device, and thereby communicating in a bidirectional communication between the central control device and the at least one decentralized data processing device for the purpose of configuring the system;

within the bidirectional communication:

transmitting data from the central control device to the at least one decentralized data processing device as a sequence of synchronization pulses; and transmitting data from the at least one decentralized data processing device to the central control device as a data packet following the synchronization pulse; and coding the information contained in a configuration sequence into the synchronization pulse.

2. The method according to claim 1, which comprises configuring the at least one decentralized data processing device during an initialization phase of the system.

3. The method according to claim 1, wherein the step of configuring a decentralized data processing device includes sending a predetermined configuration sequence to be analyzed by the decentralized data processing device.

4. The method according to claim 1, wherein the step of configuring a decentralized data processing device includes at least an assignment of a unique address, the unique address defining a transmission time point following a receipt of a synchronization pulse for the normal operating mode, the transmission time point being unique within the system.

5. The method according to claim 4, which comprises transmitting the address of a decentralized data processing device from the decentralized data processing device to the central control device following successful configuration.

6. The method according to claim 1, which comprises, during the course of configuring a further decentralized data processing device, transmitting a status to the central control device from a decentralized data processing device that has already been configured.

7. The method according to claim 1, wherein a decentralized data processing device that has already been configured ignores a configuration sequence transmitted via the data line.

8. The method according to claim 1, which comprises transmitting a configuration end sequence as a configuration sequence after configuration of all decentralized data processing devices is complete, and subsequently switching the system into the normal operating mode.

9. The method according to claim 1, which comprises sequentially configuring a plurality of decentralized data processing devices connected to the bus line.

10. The method according to claim 1, which comprises, in an event of an unsuccessful configuration of one of the decentralized data processing devices, terminating the configuration and reconfiguring all decentralized data processing devices attached to the data line.

11. The method according to claim 1, which comprises selecting a common frequency of periodic synchronization pulses and/or a common pulse/pause ratio during the configuration and during the normal operating mode.

12. The method according to claim 1, wherein the decentralized data processing device is a sensor unit and the data packets transmitted from the sensor unit to the central control device contain sensor measured values.

13. The method according to claim 1, which comprises transmitting the synchronization pulse as a voltage pulse.

14. The method according to claim 1, which comprises transmitting the data packets of the decentralized data processing device as current pulses.

15. A central control device for implementation of the method according to claim 1, comprising a synchronization pulse generator for generating periodic synchronization pulses to be transmitted on a data line, and means for controlling said synchronization pulse generator, said means initiating a generation or non-generation of a synchronization pulse depending on a configuration sequence to be generated.

16. The method according to claim 1, wherein a transmission of a synchronization pulse corresponds to a logical "1" while an absence of a synchronization pulse corresponds to a logical "0", and wherein from the sequence of subsequently following synchronization pulses the information contained in the configuration sequence are coded in the synchronization pulses.

17. The method according to claim 1, wherein the configuration sequence indicates how the decentralized data processing device is to be configured.

* * * * *